United States Patent [19]

Bower, Jr.

[11] Patent Number: 5,549,021

[45] Date of Patent: Aug. 27, 1996

[54] TOOL FOR STRIPPING CENTER CONDUCTORS OF SUBMINIATURE RIBBON COAXIAL CABLE

[75] Inventor: Hadley H. Bower, Jr., Oklahoma City, Okla.

[73] Assignee: Lucent Technologies Inc., Murray Hill, N.J.

[21] Appl. No.: 509,720

[22] Filed: Jul. 31, 1995

Related U.S. Application Data

[63] Continuation-in-part of Ser. No. 268,056, Jun. 29, 1994.

[51] Int. Cl.$^6$ .................................................. H02G 1/12
[52] U.S. Cl. ................................................................ 81/9.51
[58] Field of Search .............................................. 81/9.51

[56] References Cited

U.S. PATENT DOCUMENTS

| | | | |
|---|---|---|---|
| 4,649,636 | 3/1987 | Arbogast et al. | 81/9.51 X |
| 4,662,968 | 5/1987 | Bleuel et al. | 81/9.51 X |
| 4,793,221 | 12/1988 | Leandris et al. | 81/9.51 |
| 4,815,207 | 3/1989 | Schwartzman | 81/9.51 X |
| 5,297,457 | 3/1994 | Hoffa | 81/9.51 |

Primary Examiner—James G. Smith
Attorney, Agent, or Firm—Michael B. Johannesen

[57] ABSTRACT

A tool for stripping center conductors of subminiature coaxial ribbon cable and preparing it for connection to connectors or other components comprises a base, a holding fixture movably mounted on the base, and a vertical assembly mounted over the holding fixture. The vertical assembly contains holding, conductor cutting, forming and insulation cutting blades. In operation, the holding blade is lowered to hold a portion of the cable's insulation. The cutting blade cuts any extra length of conductors. The forming blade forms the drains so that they extend perpendicularly from the rest of the ribbon cable. The insulation cutting blade cuts insulation from the center conductor.

14 Claims, 11 Drawing Sheets

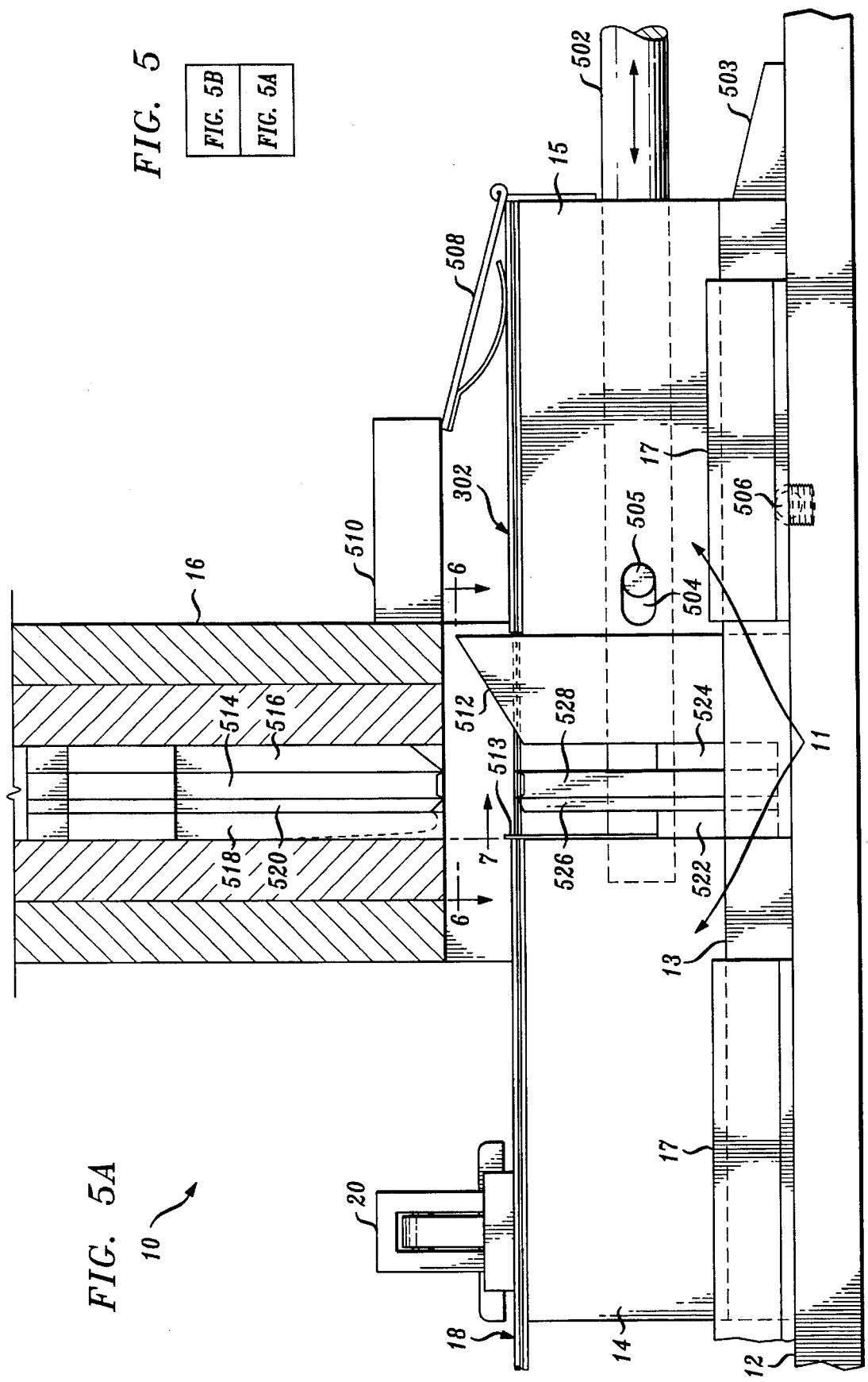

5,549,021

TOOL FOR STRIPPING CENTER CONDUCTORS OF SUBMINIATURE RIBBON COAXIAL CABLE

This application is a continuation-in-part division of application Ser. No. 08/268,056, filed on Jun. 29, 1994.

TECHNICAL FIELD

This invention relates to the field of tools for preparing cable for installation, and, more specifically, to a tool for stripping subminiature ribbon coaxial cable in preparation for its connection to connectors or other components.

BACKGROUND OF THE INVENTION

Subminiature ribbon coaxial cable is used in many applications in the electronics industry for connecting small electronic components to other small components. Such subminiature ribbon coaxial cable 18 is shown in cross section in FIG. 2. Subminiature ribbon coaxial cable generally comprises an outer jacket 200 made of plastic or other elastomeric material which insulates and holds together a plurality of subminiature coaxial cables. Inside outer jacket 200 is an insulating shield 202 (also called a "sheath"), each surrounding, in this embodiment, two outer conductor or "drain" wires 204 and center conductor insulation 206 which surrounds a center conductor 208.

It is known in the art that them are tools available to cut the outer jacket 200 and shields 202 and then partially pull apart the outer jacket to form a "tab" 302 as shown in FIG. 3. It is desirable to remove tab 302 to form the configuration as shown in FIG. 4, wherein drain wires 204 are bent perpendicularly to the subminiature ribbon coaxial cable 18 and a portion of the center conductor insulation 206 is stripped from center conductor 208 to prepare the end of the center conductor (known as "shiner" when the insulation is removed) for connection to other components. It is currently known in the art that this is a manual action.

Therefore, a problem in the art is that there is no tool for fully stripping and forming subminiature coaxial ribbon cable for connection to connecting or other components.

SUMMARY OF THE INVENTION

This problem is solved and a technical advance is achieved in the art by a tool that can fully strip subminiature ribbon coaxial cable and prepare it for connection. The tool according to this invention comprises a base, a two part two part holding fixture movably mounted on the base and a vertical assembly mounted over the two-part holding fixture. The vertical assembly contains a blade for forming drains, a blade for holding the insulated center conductor, a blade for cutting the center conductor, and a blade for cutting the center conductor insulation. All of the blades are air actuated.

A length of subminiature coaxial cable is prepared for insertion into this tool by cutting the outer jacket and sheaths, thus forming a tab, as is known in the art. The cable with tab is fixed in the holding fixture. The holding fixture is moved under the vertical assembly. The holding blade is then lowered, holding the drains and insulated center conductors. Next, the tab, extra length of drains and insulated center conductors are sheared off by a cutting blade. Next, the drains are formed by action of drain-forming blade so that they extend perpendicularly from the rest of the subminiature ribbon coaxial cable. The insulation is then cut around center conductor by the insulation cutting blade. Next, a front portion of the holding fixture is moved to slide each center conductor from its respective center conductor insulation. All blades are then raised and both portions of the holding fixture are moved back to the unload position where the prepared ribbon subminiature button coaxial cable and tab end surplus can then be removed.

BRIEF DESCRIPTION OF THE DRAWINGS

A more complete understanding of the invention may be obtained from a consideration of the following description in conjunction with the drawings in which.

DETAILED DESCRIPTION

Figure 1:
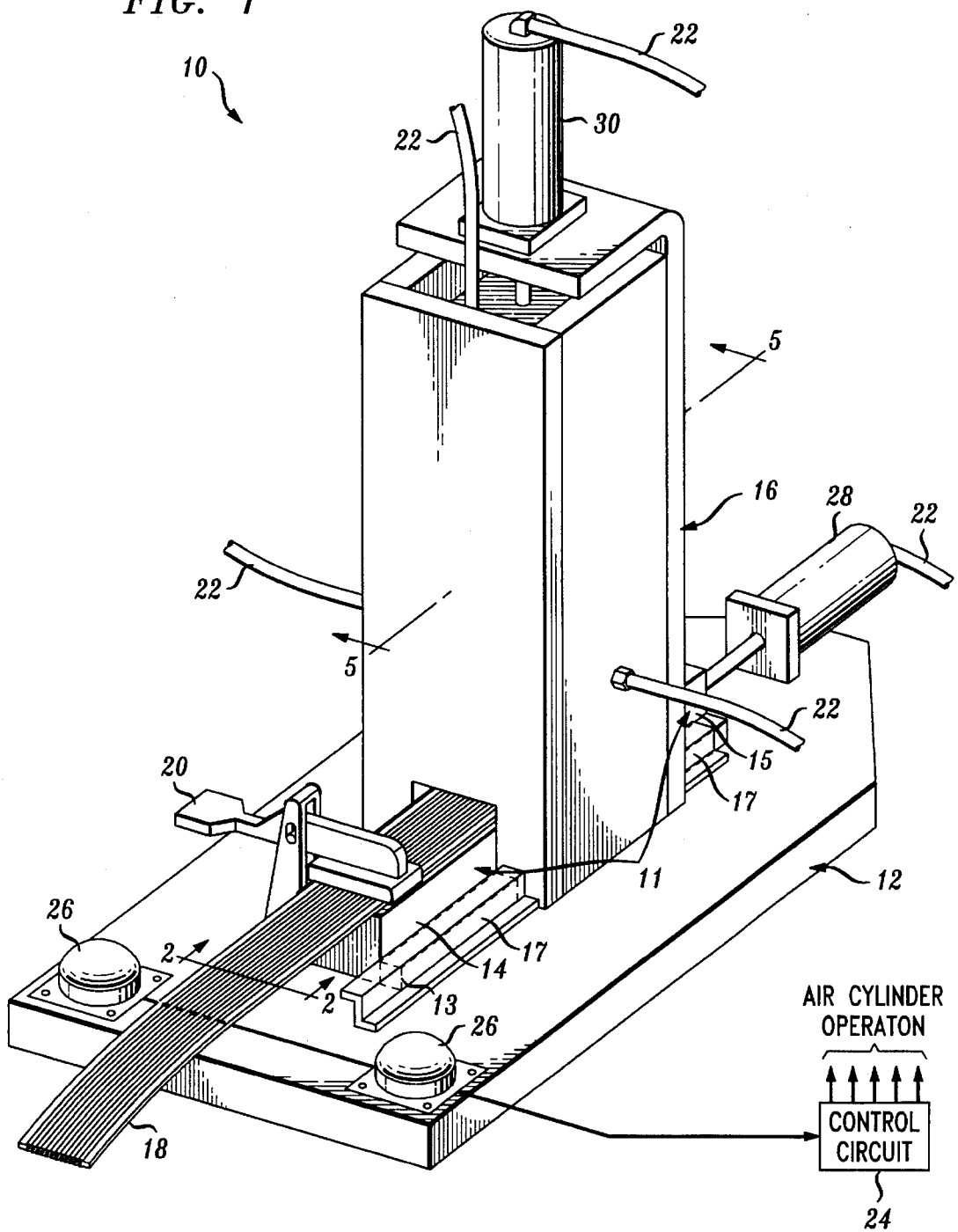
FIG. 1 is a perspective view of a subminiature ribbon coaxial cable stripping tool according to the exemplary embodiment of this invention.
Figure 2:
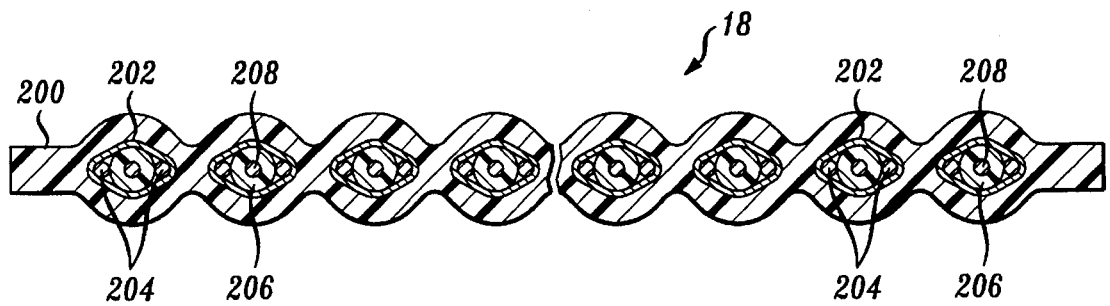
FIG. 2 is a cross section of subminiature ribbon coaxial cable as is known in the art.

FIG. 1 is a perspective view of a tool for stripping subminiature ribbon coaxial cable and preparing it for connection to connectors or other components. The tool, according to an exemplary embodiment of this invention, includes base 12, upon which rails 13 and vertical holding assembly 16 are mounted. A holding fixture 11 comprising front portion 14 and rear portion 15, is movably mounted on base 12 and aligned by rails 13 by guides 17. Front portion 14 of holding fixture 11 holds subminiature ribbon coaxial cable 18 as it is stripped and formed. To this end, cable holding clamp 20 is also mounted on front portion 14 of holding fixture 11 to hold subminiature ribbon coaxial cable 18 in place while it is being cut and formed.

A plurality of air hoses 22 provides air pressure for operation of the tool according to this exemplary embodiment. Air hoses 22 receive positive air pressure from one or more air sources under control of control circuit 24. Such air pressure sources are well known in the art and are thus not shown. Control circuit 24 operates responsive to both palm buttons 26 being pressed. Palm buttons 26 are well known in the art as being a relatively safe method for using equipment such as tool 10.

Horizontal double acting air cylinder 28 provides horizontal motion to front portion 14 and rear portion 15 of the holding fixture 11. Vertical double acting air cylinder 30 provides action for motion of plungers which actuate movable blades, as will be described below.

Figure 5B:
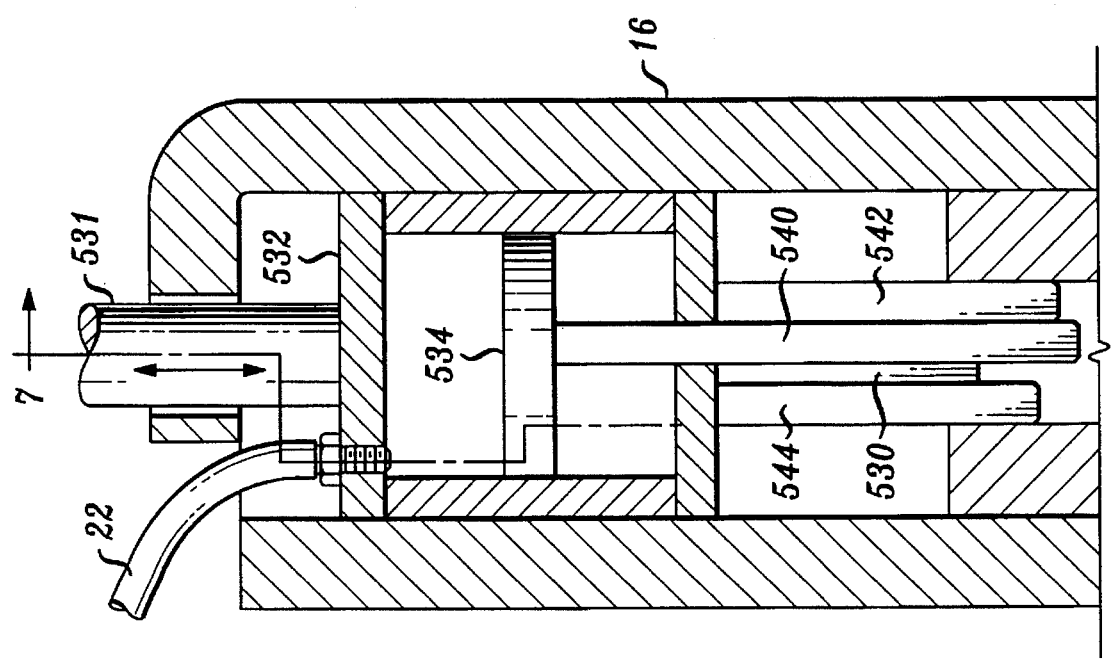
FIG. 5 is a cross section of the subminiature ribbon coaxial cable stripping tool of FIG. 1.

FIG. 5 comprises FIGS. 5A and 5B. FIG. 5A is a cross section of base 12 and a portion of vertical holding assembly 16 taken along line 5—5 in FIG. 1. FIG. 5A illustrates base 12 and holding fixture 11, which comprises a front portion 14 and rear portion 15. Front portion 14 to which front alignment block 513 is permanently affixed and rear portion 15 to which 512, 522, 524, 526, and 528 are permanently affixed are movably mounted on base 12, and move via action of horizontal shaft 502 which is operated by horizontal double acting air cylinder 28 (FIG. 1). Horizontal double acting air cylinder 28 moves holding fixture 11 including 512, 522, 524, 526, and 528 completely out from under vertical assembly 16 for loading and unloading the prepared subminiature ribbon coaxial cable 18. Movement of front portion 14 and rear portion 15 of holding fixture 11 is guided by rails 13 by guides 17. After loading of the prepared subminiature ribbon coaxial cable 18, horizontal double acting air cylinder 28 (FIG. 1) moves holding fixture 11 back under vertical assembly 16 until holding fixture 11 meets stop 503. During operation, as will be explained further, below, horizontal shaft 502 causes front portion 14 of holding fixture 11 to move forward 0.010 inches while rear portion 15 remains stationary, in order to pull center conductor 208 from the severed part of center conductor insulation 206. To this end, slot 504 provides for such independent movement of front portion 14. Detent 506 (comprising a ball and spring) retains rear portion 15 in position until pin 505 makes contact with the front wall of slot 504, which overcomes detent 506 and causes rear portion 15 to move forward.

Figure 3:
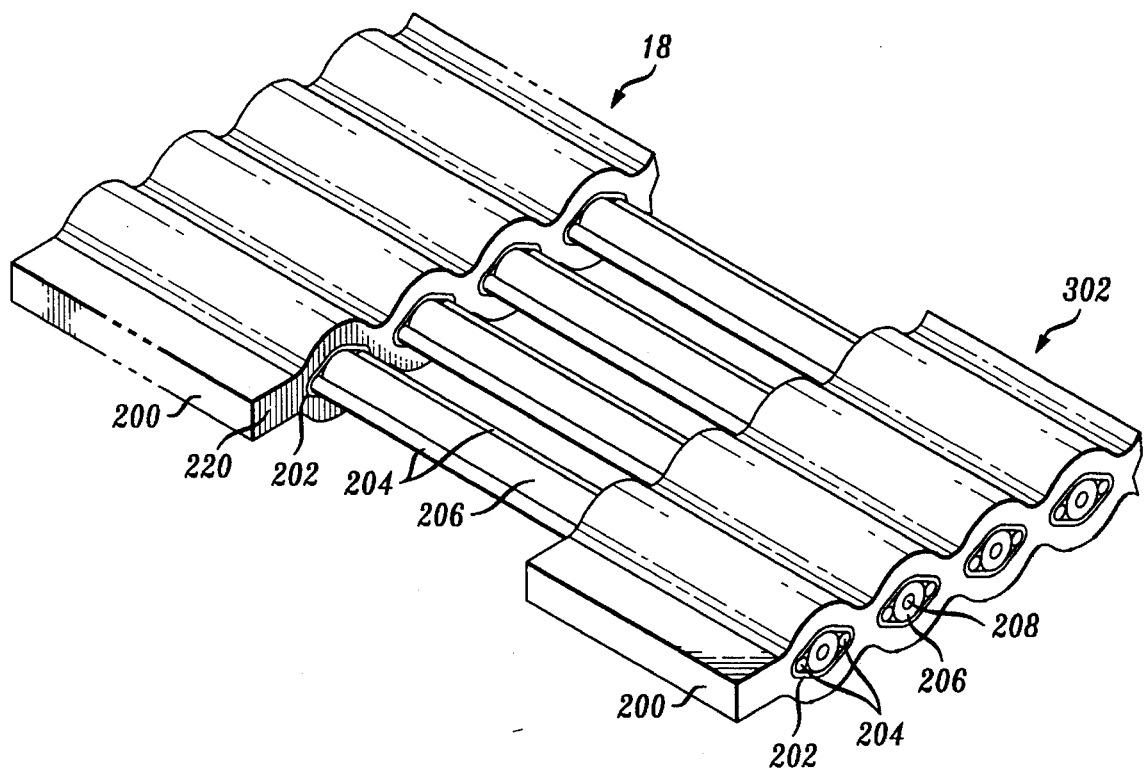
FIG. 3 is an isometric view of the subminiature ribbon coaxial cable of FIG. 2 as prepared in the prior art.

Tab 302 is held on rear portion 15 of holding fixture 11 by latch 508, which is hingedly mounted on holding fixture 11. Tab 302 is loaded onto holding fixture 11 as part of prepared subminiature coaxial cable assembly, FIG. 3 and then latch 508 is lowered and front portion 14 and rear portion 15 of holding fixture 11 are moved simultaneously under vertical assembly 16 and hold-down block 510.

Figure 6:
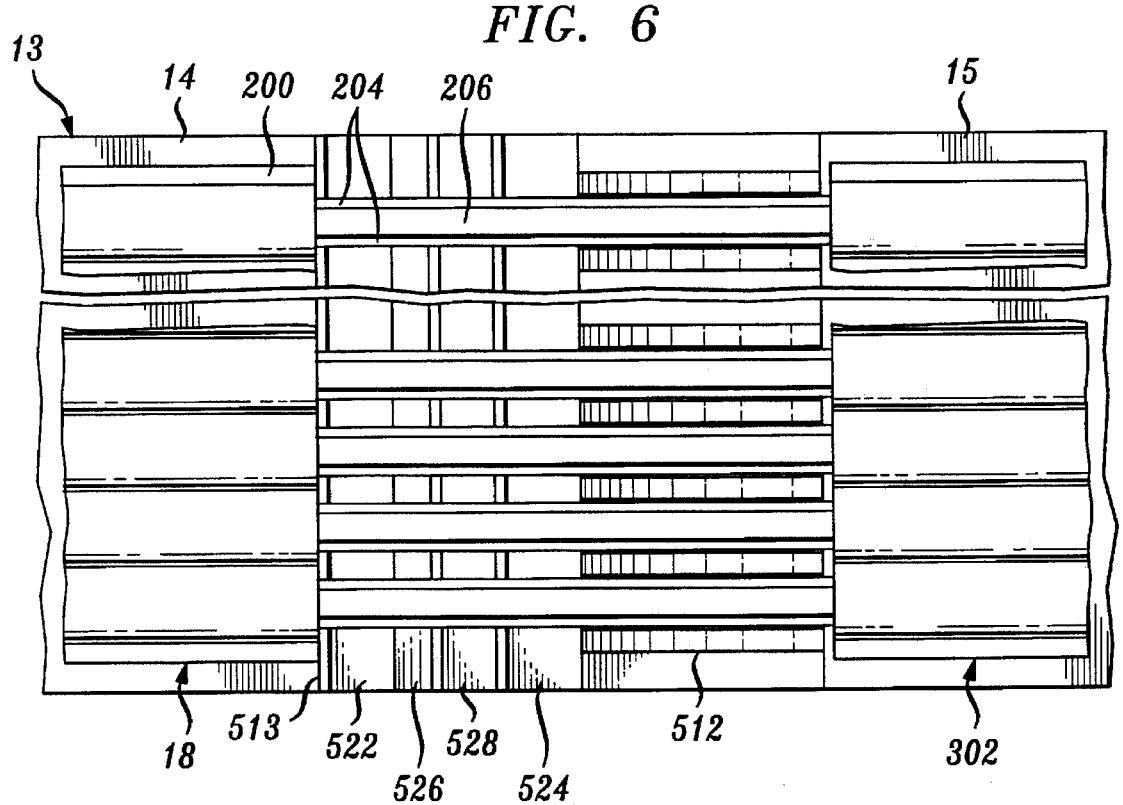
FIG. 6 is a plan view looking downwardly from the section lines in FIG. 5A.

Rear alignment block 512 aides in aligning prepared subminiature ribbon coaxial cable 18 and tab 302 by providing a guide for the exposed drain wires 204 and center conductor 208 with center conductor insulation 206, as shown in FIG. 6. Front alignment block 513 also aligns edge 220 of the subminiature ribbon coaxial cable 18 by butting up against it.

In vertical assembly 16, there are four movably mounted blades. Movable holding blade 514, when lowered or "actuated", holds center conductor 208 with associated center conductor insulation 206 in position. Movable shearing blade 516 shears off extra center conductor 208, associated center conductor insulation 206 and extra drains 204 against fixed holding blade 528 and cuts the remaining insulation 206 of the subminiature ribbon coaxial cable to the correct length for application. Movable center conductor drain forming blade 518 provides downwardly formed drains 204 as viewed in FIG. 4 (in relation to the center conductors). Movable center conductor insulation cutting blade 520 cuts center conductor insulation 206 in conjunction with fixed center conductor cutting blade 526.

Located between holding fixture 11 front portion 14 and attached to rear portion 15 are spacers 522 and 524, and fixed center conductor insulation cutting blade 526 (which contacts movable center conductor insulation cutting blade 520). Also located between the front portion 14 and fixed to rear portion 15 of holding fixture 11 is fixed holding blade 528 which provides contact with movable holding blade 514.

FIG. 5B shows further detail of an upper portion of vertical holding assembly 16. A vertical shaft 531 is attached to vertical air cylinder 30 (FIG. 1) and piston 532 which provides upward and downward motion of piston 532. Piston 532 actuates plungers 542, 544, and 530, which contact and lower movable shearing blade 516, movable drain forming blade 518, and movable center conductor insulation blade 520, respectively. Piston 534 is operable through air pressure entering through air hose 22. Piston 534 actuates plunger 540 which contacts and lowers movable holding blade 514.

In the exemplary embodiment of this invention, after cable 18 has been loaded into the holding fixture, and the palm buttons 26 (FIG. 1) actuated, the holding fixture moves under vertical assembly 16, and piston 534 moves plunger 540, which in turn moves movable holding blade 514 downwardly trapping the 0.010 inch shiner area of center conductor 208 and insulation 206 that will ultimately be stripped from the center conductors. The exterior vertical double acting air cylinder 30 (FIG. 1) then pushes on the vertical shaft 531 forcing plungers 542, 544, and 530 downwardly, while overriding the air pressure on piston 534. Plunger 542 contacts movable shearing blade 516 which shears off tab 302 and excess center conductors 208 with included center conductors 206 and drains 204.

Next, plunger 544 makes contact with movable drain forming blade 518, and, in its continuing downward motion, strips drains 204 from the junction of movable holding blade 514 and fixed holding blade 548, and forms them against the rear face of the front portion 14 of holding fixture 11. Plunger 530 then contacts movable center conductor insulation cutting blade 520 forcing it downwardly to cut the center conductor insulation 206 and holds movable insulation cutting blade 520 closed against fixed cutting blade 526 for the first 0.100 inch forward movement of front portion 14 of holding fixture 11. The front portion 14 of holding fixture 11 begins to move forward by action of horizontal double acting cylinder 28 on shaft 502, which first causes front portion 14 to move; the rear portion of holding fixture 11 is not moving at this time. After approximately the first 0.100 inch of movement of front portion 14 of holding fixture 11, vertical double acting air cylinder 30 reverses, allowing blades 516, 518 and 520 to move upwardly and clear holding fixture 11. After 0.100 inches of movement of front portion 14 of holding fixture 11, the air pressure through air hose 22 on piston 534 releases and movable holding blade 514 moves upwardly to clear the holding fixture. Pin 505 then contacts front wall of slot 504, which causes rear portion 15 of holding fixture 11 to move and the entire holding fixture 11 moves out from under vertical assembly 16 for unloading.

FIG. 6 illustrates a portion of holding fixture 11, looking downwardly from line 6—6 of FIG. 5A. In this view, subminiature ribbon coaxial cable 18 is shown prepared for cutting. Tab 302 is held in alignment by rear alignment blocks 512. Edges of fixed center conductor cutting blade 526 and center conductor holding blade 528 are shown in contact with subminiature ribbon coaxial cable ribbon 18. Rear alignment block 512 includes a plurality of fingers which are illustrated as interleaving with drains 204 and center conductors 208 which includes center conductor 206, in order to hold and properly align cable ribbon 18 and tab 302.

Figure 7:
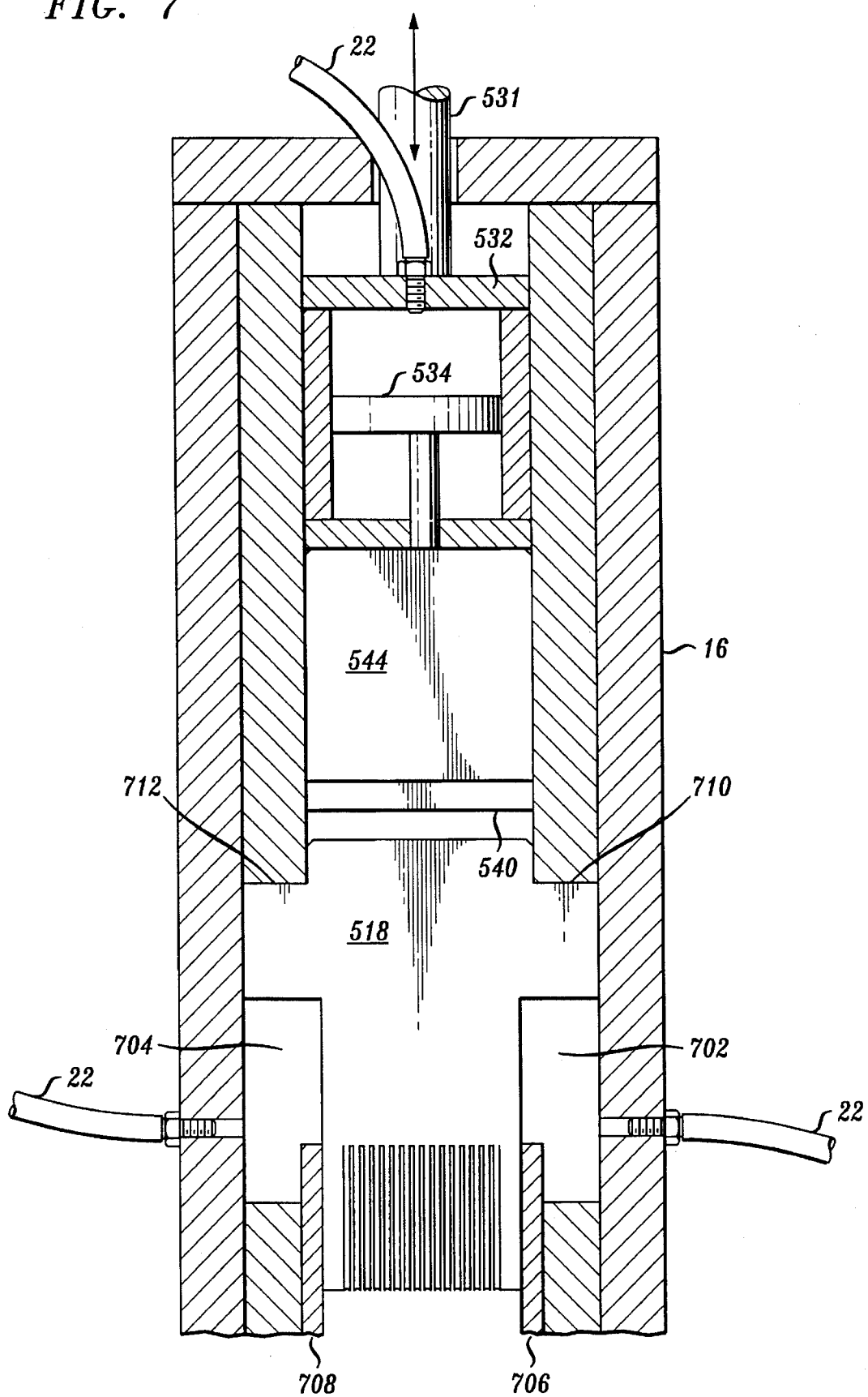
FIG. 7 is a cross section of the vertical holding assembly of the subminiature ribbon coaxial cable stripping tool of FIG. 1.

Turning now to FIG. 7, cross section of vertical holding assembly taken along line 7—7 of FIG. 5 at movable drain forming blade 518 is shown. FIG. 7 shows air chambers 702 and 704, which, when pressurized, returns movable drain forming blade 518 to its fully retracted position. Movable drain forming blade 518 moves on guides 706 and 708 to ensure that the blade moves vertically only. Movable drain forming blade 518, and likewise, the other blades, move upwardly until they stop on stops 710 and 712.

Figure 4:
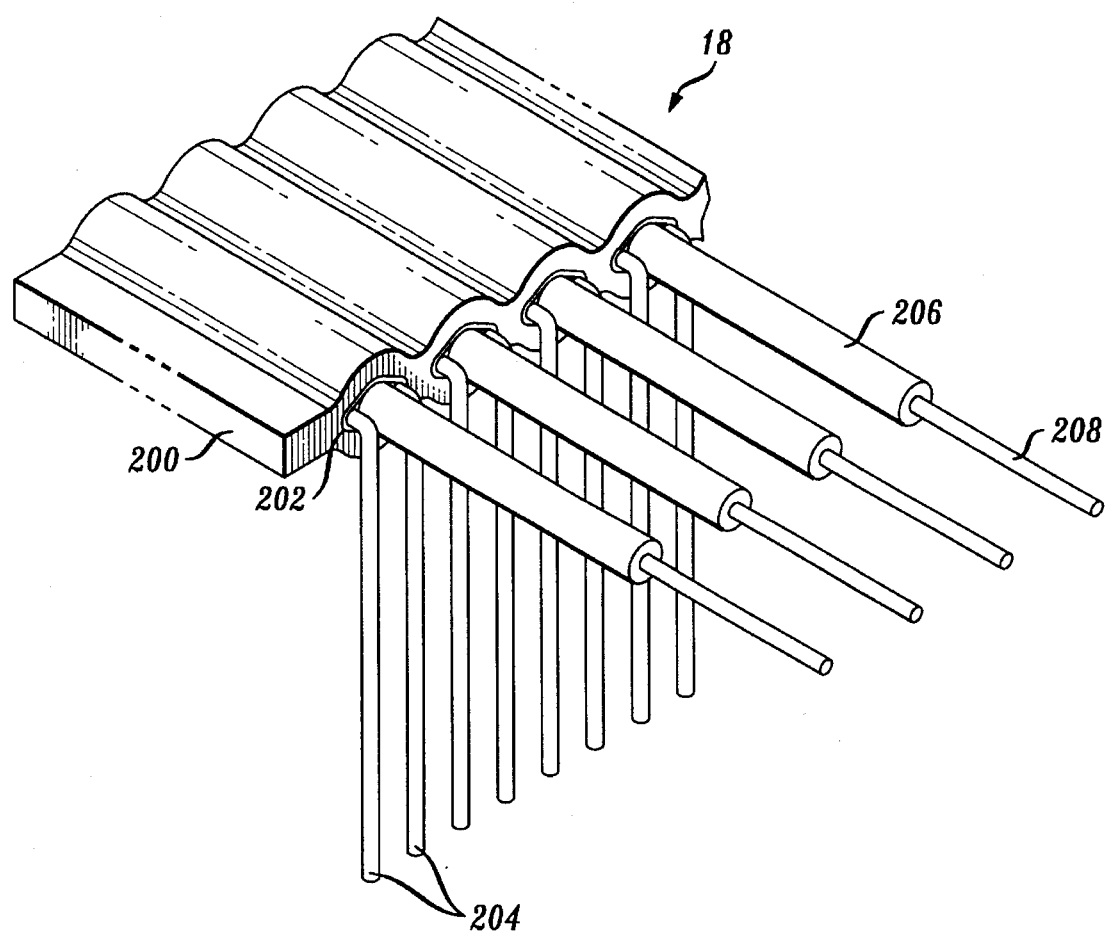
FIG. 4 is an isometric view of subminiature ribbon coaxial cable of FIG. 2 prepared for connection.
Figure 8:
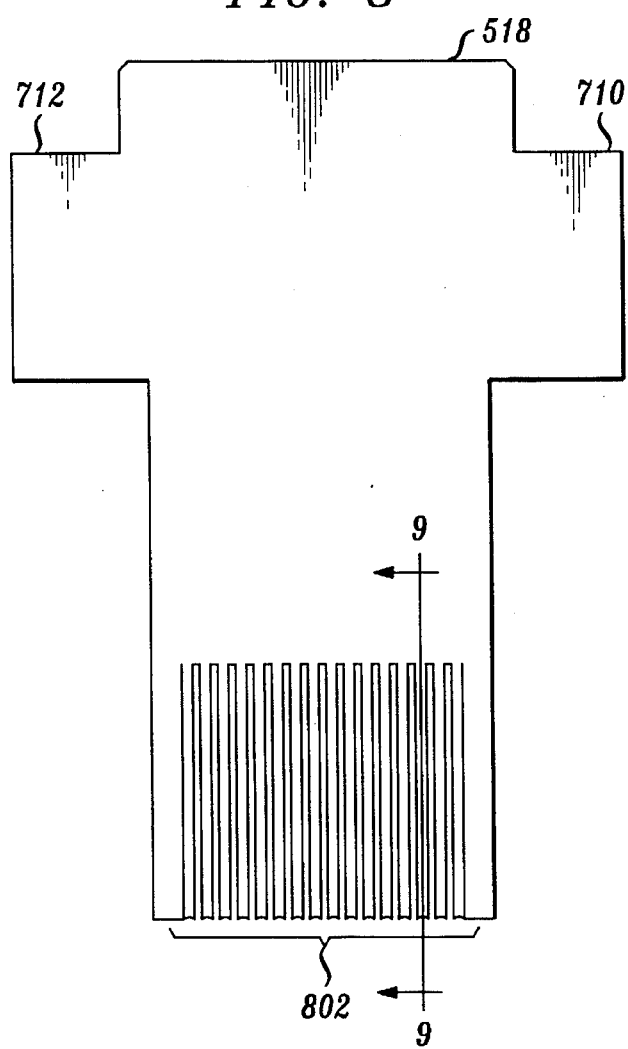
FIG. 8 is a front view of the movable drain forming blade.
Figure 9:
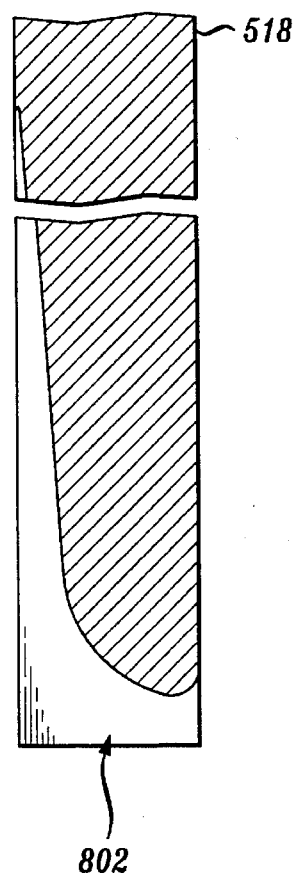
FIG. 9 is a cross section of the movable drain forming blade, taken along line 9—9 of FIG. 8.

Turning now to FIG. 8, movable drain forming blade 518 is shown. Movable drain forming blade 518 comprises a plurality of teeth 802 formed so that they interleave with center conductors 208 covered by center conductor insulation 206 and only contact drains 204. FIG. 9 shows a cross section of movable drain forming blade 518 taken along lines 9—9 of FIG. 8. FIG. 9 shows the cross section of movable drain forming blade 518 so that drain wire 204 is moved into position as shown in FIG. 4.

Figure 10:
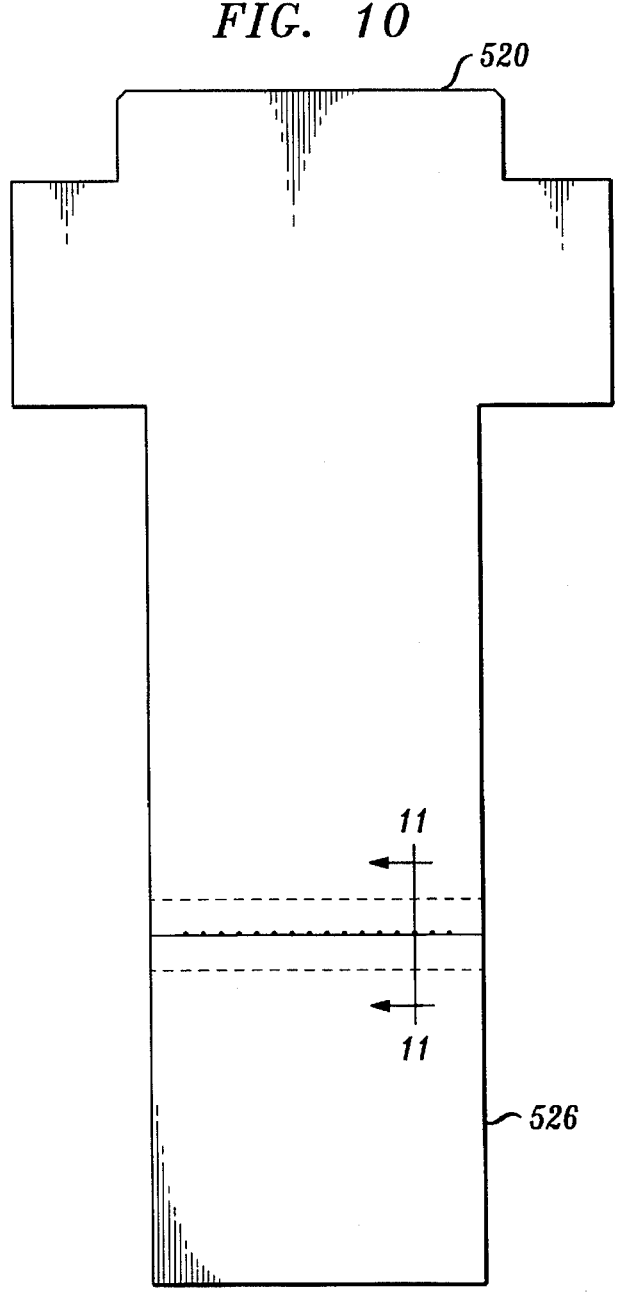
FIG. 10 is a front view of the movable and fixed center conductor insulation cutting blade.
Figure 11:
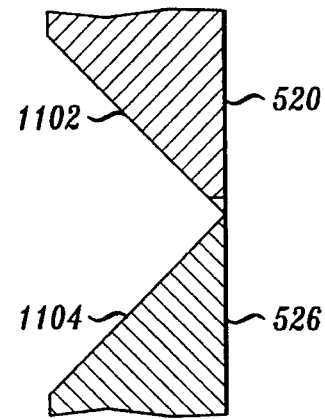
FIG. 11 is a cross section of the movable and fixed center conductor insulation cutting blades, taken along line 11—11 of FIG. 10.

FIG. 10 illustrates movable center conductor insulation cutting blade 520 and fixed center conductor insulation cutting blade 526 as they meet. FIG. 11 illustrates the meeting of movable insulation cutting blade 520 and fixed insulation cutting blade 526 showing beveled surfaces 1102 and 1104 on blade 520 and 526, respectively.

Figure 12:
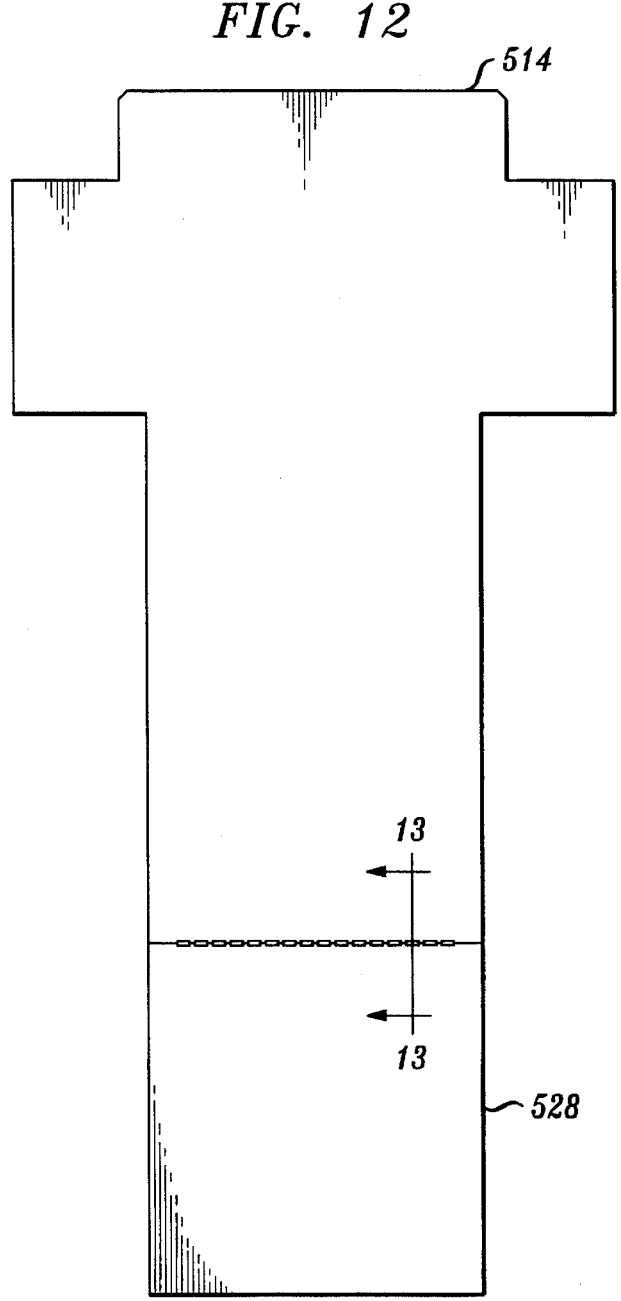
FIG. 12 is a front view of the movable and fixed holding blades.
Figure 13:
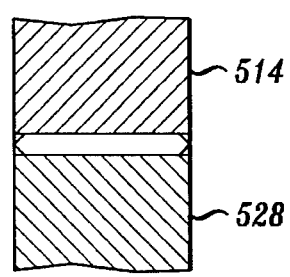
FIG. 13 is a cross section of the junction of the movable and fixed holding blades, taken along line 13—13 of FIG. 12.

FIG. 12 shows movable holding blade 514 and fixed holding blade 528. FIG. 13 shows how movable holding blade 514 meets with fixed holding blade 528 so that a portion of the center conductor insulation 206 can be fixedly held.

Figure 14:
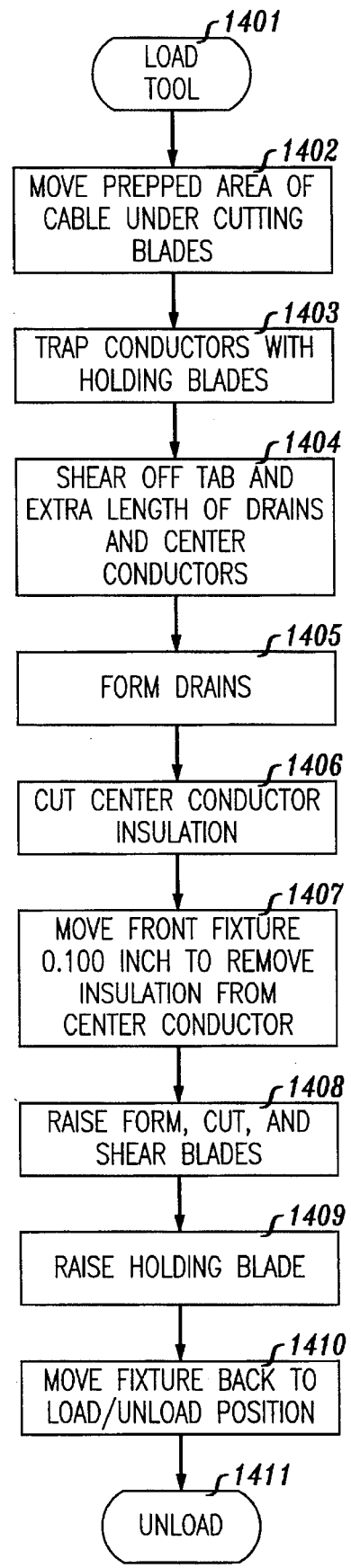
FIG. 14 illustrates a flowchart of the steps in the operation of the subminiature coaxial cable stripping tool of FIG. 1.

Turning now to FIG. 14, a flowchart of the operation of the tool 10 (FIG. 1) is shown. As stated above, a tab is formed on subminiature ribbon coaxial cable prior to loading of this tool. Operations start in circle 1401 where the fixture is loaded, where the subminiature ribbon coaxial cable including the tab is aligned on front alignment block 513 and rear alignment block 512. In box 1402, the prepared area of the cable is moved under the cutting blades contained in vertical assembly 16. In box 1403, the conductors are trapped between movable holding blades 514 and fixed holding blade 528.

In box 1404, the tab, including extra length of drains and insulated center conductors, are sheared off by plunger 542 acting on movable shearing blade 516 in cooperation with fixed holding blade 528. In box 1405, the drains 204 are formed by plunger 544 acting on movable drain forming blade 518. In box 1406, the insulation of the center conductor is cut by movable center conductor insulation cutting blade 520 and fixed center conductor insulation cutting blade 526 and in box 1407, front portion 14 of holding fixture 11 is moved 0.100 inches to remove insulation 206 from center conductor 208. In box 1408, the blades 516, 518, and 520 are all raised and in box 1409, movable holding blade 514 is retracted. In box 1410, the full holding fixture, including front portion 14 and rear portion 15 and attachments thereto, including the tab that was sheared off, are moved back to the load/unload position wherein in circle 1411 the prepared ribbon cable is unloaded.

It is to be understood that the above-identified embodiment is merely an illustration of the principles of this invention, and that many variations may be devised by those skilled in the art without departing from the scope of the invention. It is, therefore, intended that such variations be included within the scope of the following claims.

I claim:

1. A tool for stripping subminiature coaxial cable ribbon, said cable ribbon comprising a plurality of center conductors surrounded by insulation, and a plurality of outer conductors, said tool comprising:
   means for cutting said center conductor insulation;
   means for cutting said center conductors and said outer conductor;
   means for drawing a cut portion of said center conductor insulation from said center conductors;
   means for drawing a cut portion of said coaxial cable ribbon away from the rest of said coaxial cable ribbon; and
   means for automatically controlling said means for cutting said conductor insulation, said means for cutting said center conductor said means drawing a cut portion of said center conductor insulation and said means for drawing said cut portion of said coaxial cable ribbon.

2. A tool according to claim 1 further including means for forming said outer conductors by bending.

3. A tool according to claim 2 wherein said means for forming said outer conductors orients said outer conductors perpendicularly to said coaxial cable ribbon.

4. A tool according to claim 1 further including means for holding said coaxial cable ribbon stationary during operation.

5. A tool according to claim 1 further including means for holding said coaxial cable ribbon attached to said means for drawing the excess coaxial cable ribbon.

6. A tool according to claim 1 further including means for holding and separating each of said plurality of insulated center conductors during cutting and stripping of said insulation.

7. A tool according to claim 1 wherein each of said means for cutting comprises a fixed blade and a movable blade, wherein said subminiature coaxial cable is placed upon each of said fixed blades and each of said movable blades are lowered in order to cut.

8. A tool according to claim 1 wherein said means for cutting said center conductor insulation, means for cutting said center conductor, means for cutting said outer conductor, and means for drawing are air actuated.

9. A tool according to claim 1 further including means for removing said center conductor insulation.

10. A tool for stripping center conductors of subminiature coaxial cable ribbon, said coaxial cable ribbon comprising a plurality of center conductors surrounded by insulation, and two drains for each of said plurality of center conductors, wherein a sheath surrounds each center conductor and two drains and an insulative ribbon holds a plurality of said sheaths, said subminiature coaxial cable ribbon being previously prepared by severing said insulative ribbon and said plurality of sheaths and forming a tab of said insulative ribbon and said plurality of sheaths, said tool comprising:
   a base;
   a holding fixture movably mounted on said base, said holding fixture having a first portion and a second portion which move independently in relation to each other, said first portion of said holding fixture being adapted to hold said prepared coaxial ribbon cable and said second portion of said holding fixture being adapted to hold said tab, wherein said second portion may remove said tab, insulation and excess center conductor from said coaxial ribbon cable after cutting; and
   a vertical assembly mounted over said holding fixture, said vertical assembly having a blade for holding said insulated center conductor, a blade for cutting said center conductor, and a blade for cutting said center conductor insulation.

11. A tool according to claim 10 wherein said vertical assembly further includes a drain forming blade for forming said plurality of drains perpendicularly to said coaxial cable ribbon.

12. A tool according to claim 10 wherein said holding fixture includes an alignment block for aligning said subminiature coaxial cable ribbon and separating said center conductors.

13. A tool according to claim 10 wherein said tool includes a control means for actuating said blade for holding, said blade for cutting said center conductor and said blade for cutting said center conductor insulation in a predefined sequence.

14. A tool according to claim 10 wherein said tool is air actuated.

* * * * *